(12) United States Patent
Breen

(10) Patent No.: US 11,199,196 B2
(45) Date of Patent: Dec. 14, 2021

(54) GEARED TURBOFAN ENGINE

(71) Applicant: ROLLS-ROYCE plc, London (GB)

(72) Inventor: Clive Breen, Derby (GB)

(73) Assignee: ROLLS-ROYCE plc, London (GB)

( * ) Notice: Subject to any disclaimer, the term of this patent is extended or adjusted under 35 U.S.C. 154(b) by 330 days.

(21) Appl. No.: 16/398,870

(22) Filed: Apr. 30, 2019

(65) Prior Publication Data

US 2020/0173456 A1 Jun. 4, 2020

(30) Foreign Application Priority Data

Nov. 29, 2018 (GB) .................................. 1819413.4

(51) Int. Cl.
| | | |
|---|---|---|
| F04D 29/32 | (2006.01) | |
| F03D 1/06 | (2006.01) | |
| B64C 11/10 | (2006.01) | |
| F02C 7/36 | (2006.01) | |
| F04D 29/66 | (2006.01) | |
| B64C 27/46 | (2006.01) | |

(52) U.S. Cl.
CPC ............ *F04D 29/329* (2013.01); *B64C 11/10* (2013.01); *B64C 27/463* (2013.01); *F02C 7/36* (2013.01); *F03D 1/0691* (2013.01); *F04D 29/668* (2013.01)

(58) Field of Classification Search
None
See application file for complete search history.

(56) References Cited

U.S. PATENT DOCUMENTS

| | | | | |
|---|---|---|---|---|
| 6,354,780 | B1 * | 3/2002 | Davis | F01D 5/027 |
| | | | | 414/146 |
| 6,520,742 | B1 | 2/2003 | Forrester et al. | |
| 8,182,229 | B2 | 5/2012 | Rajarajan et al. | |
| 9,410,440 | B2 | 8/2016 | Dimelow | |
| 10,047,699 | B2 * | 8/2018 | Sabnis | F01D 5/06 |
| 10,072,510 | B2 * | 9/2018 | Miller | F01D 7/02 |
| 10,677,169 | B1 * | 6/2020 | Breen | F02C 7/36 |
| 2014/0196472 | A1 | 7/2014 | Kupratis et al. | |
| 2015/0152880 | A1 * | 6/2015 | Reiss | F04D 29/388 |
| | | | | 416/229 A |
| 2015/0192144 | A1 | 7/2015 | Murdock et al. | |
| 2016/0146025 | A1 * | 5/2016 | Miller | F01D 9/041 |
| | | | | 60/805 |
| 2017/0096941 | A1 * | 4/2017 | Antelo | F02C 3/107 |
| 2017/0167504 | A1 | 6/2017 | Jablonski et al. | |

(Continued)

*Primary Examiner* — Ninh H. Nguyen
*Assistant Examiner* — Jason Fountain
(74) *Attorney, Agent, or Firm* — Oliff PLC

(57) ABSTRACT

A gas turbine engine for an aircraft, includes: an engine core having a turbine, a compressor, and a core shaft connecting the turbine to the compressor; a fan assembly located upstream of the engine core; and a gearbox receiving an input from the core shaft and outputs drive to the fan assembly so as to drive the fan assembly at a lower rotational speed than the core shaft, wherein the fan assembly has fan blades mounted around a hub, the fan blades having blade tips defining an outer diameter of the fan assembly of from around 220 cm to around 400 cm, the hub having slots located around a rim of the hub, each slot receiving a root of a corresponding fan blade, wherein a ratio of a mass of the hub to a total mass of the fan blades is within the range of around 0.45 to around 0.7.

15 Claims, 3 Drawing Sheets

(56) References Cited

U.S. PATENT DOCUMENTS

2017/0175675 A1\* 6/2017 Sabnis .................... F01D 15/12
2018/0231018 A1   8/2018 Smith et al.
2020/0173371 A1\* 6/2020 Breen ................... F01D 5/3007

\* cited by examiner

GEARED TURBOFAN ENGINE

The present disclosure relates to a geared turbofan engine.

As fan assemblies for turbofan engines become larger in overall size, for example by increasing the outer diameter of the fan assembly, various parameters are required to change to accommodate the increase in size. A larger fan assembly, for example, needs to rotate more slowly in order to prevent excessive speed at the fan tips. Other changes in consequence of this may then become necessary, such as the introduction of a gearbox to allow the turbine components of the engine that drive the fan to operate at a higher speed to that of the fan. As the fan assembly becomes larger, one problem that may need to be addressed is vibration, particularly at low rotational speeds. Such vibration may arise in the hub of the fan assembly or be exhibited as flutter in the fan blades. Simply scaling the dimensions of the various components making up a fan assembly in line with the increase in overall dimensions does not necessarily address this problem.

According to a first aspect there is provided a gas turbine engine for an aircraft, comprising:
an engine core comprising a turbine, a compressor, and a core shaft connecting the turbine to the compressor;
a fan assembly located upstream of the engine core; and
a gearbox that receives an input from the core shaft and outputs drive to the fan assembly so as to drive the fan assembly at a lower rotational speed than the core shaft,
wherein the fan assembly comprises a plurality of fan blades mounted around a hub, the fan blades having blade tips defining an outer diameter of the fan assembly of from around 220 cm to around 400 cm, the hub comprising a plurality of slots located around a rim of the hub, each slot receiving a root of a corresponding fan blade, wherein a ratio of a mass of the hub to a total mass of the plurality of fan blades is within the range of around 0.45 to around 0.7.

A hub-to-tip ratio of the fan assembly may be between around 0.2 and 0.4.

According to a second aspect there is provided a gas turbine engine for an aircraft, comprising:
an engine core comprising a turbine, a compressor, and a core shaft connecting the turbine to the compressor;
a fan assembly located upstream of the engine core; and
a gearbox that receives an input from the core shaft and outputs drive to the fan assembly so as to drive the fan assembly at a lower rotational speed than the core shaft,
wherein the fan assembly comprises a plurality of fan blades mounted around a hub, a hub-to-tip ratio of the fan assembly being between around 0.2 and 0.4, the hub comprising a plurality of slots located around a rim of the hub, each slot receiving a root of a corresponding fan blade, wherein a ratio a ratio of a mass of the hub to a total mass of the plurality of fan blades is within the range of around 0.45 to around 0.7.

The ratio of the mass of the hub to a total mass of the plurality of fan blades for first or second aspects may be within the range of around 0.5 to around 0.65, or around 0.5 to around 0.6.

For either of the first or second aspects, the ratio of the mass of the hub to the total mass of the plurality of fan blades, i.e. the hub to fan mass ratio, being within the range of around 0.45 to around 0.7, or optionally around 0.5 to around 0.65, or further optionally around 0.5 to around 0.6, enables vibrations such as flutter to be reduced or minimised, particularly at lower rotational speeds. This is particularly effective for geared turbofan applications, where larger fan diameters run at lower rotational speeds.

The hub to fan mass ratio may be around 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, or may be within a range defined by any two of the preceding values.

The rim may have a minimum radial thickness between a base of each slot and an internal cavity within the hub, wherein the minimum radial thickness is within the range of around 0.5% to around 1.1% of the outer fan diameter. Keeping the rim thickness within this preferred range can allow the overall mass of the hub to be kept within the desired range for the hub to fan mass ratio.

Defining the minimum radial thickness as being within this range allows for vibration of the hub, and flutter of the fans, to be reduced due to the localised increase in thickness of the hub rim that increases the stiffness of the hub in that region and increases the overall mass of the hub. Increasing the thickness of the rim also has the benefit of increasing the inertia of the hub proportionally more than a mass increase towards the centre of the hub, thereby potentially reducing the magnitude of vibrations arising at the fan root.

The minimum radial thickness may for example be within the range of around 0.5% to around 1.1% of the outer fan diameter.

The minimum radial thickness may be around 0.50%, 0.55%, 0.60%, 0.65%, 0.70%, 0.75%, 0.80%, 0.85%, 0.90%, 0.95%, 1.00%, 1.05%, 1.10% or within any range defined by two of the aforementioned values. The minimum radial thickness may be no greater than 35 mm, in order to prevent excessive mass of the hub, which may result in a hub to fan mass ratio being over 0.7, affecting overall efficiency of the engine. The minimum radial thickness may be around 15 mm, around 16 mm, around 17 mm, around 18 mm, around 19 mm, around 20 mm, around 21 mm, around 22 mm, around 23 mm, around 24 mm, around 25 mm, around 26 mm, around 27 mm, around 28 mm, around 29 mm, around 30 mm, around 31 mm, around 32 mm, around 33 mm, around 34 mm, around 35 mm or within a range defined by any two of the aforementioned values.

The outer diameter of the fan assembly may be around 280 cm or greater, or around 330 cm or greater.

An average of the minimum rim thickness along a rotation axis of the fan assembly may be within the range of around 0.5 to 1.1% of the outer fan diameter, if for example the minimum rim thickness varies along the rotation axis of the fan assembly.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

Arrangements of the present disclosure may be particularly beneficial for fans that are driven via a gearbox. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. For example, the gear ratio may be greater than 2.5 and/or less than 5. By way of more specific example, the gear ratio may be in the range of from 3.2 to 5, or 3.4 to 4.2. By way of further example, the gear ratio may be on the order of or at least 3, 3.1, 3.2, 3.3, 3.4, 3.5, 3.6, 3.7, 3.8, 3.9, 4, 4.1 or 4.2, or between any two of the values in this sentence. In some arrangements, the gear ratio may be outside these ranges.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius (or diameter) of the fan blade at the hub to the radius (or diameter) of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, 0.25, 0.24, 0.23, 0.22, 0.21, or 0.20. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. Such ranges may be particularly suitable for lower speed turbofan assemblies, for example those driven via a gearbox and having a relatively larger fan tip diameter compared to the hub outer diameter.

The radius of the fan may be measured between the engine centreline and the tip of a fan blade at its leading edge. The fan diameter (which may simply be twice the radius of the fan) may be greater than (or on the order of) any of: 220 cm (around 85 inches), 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 19, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise conditions. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
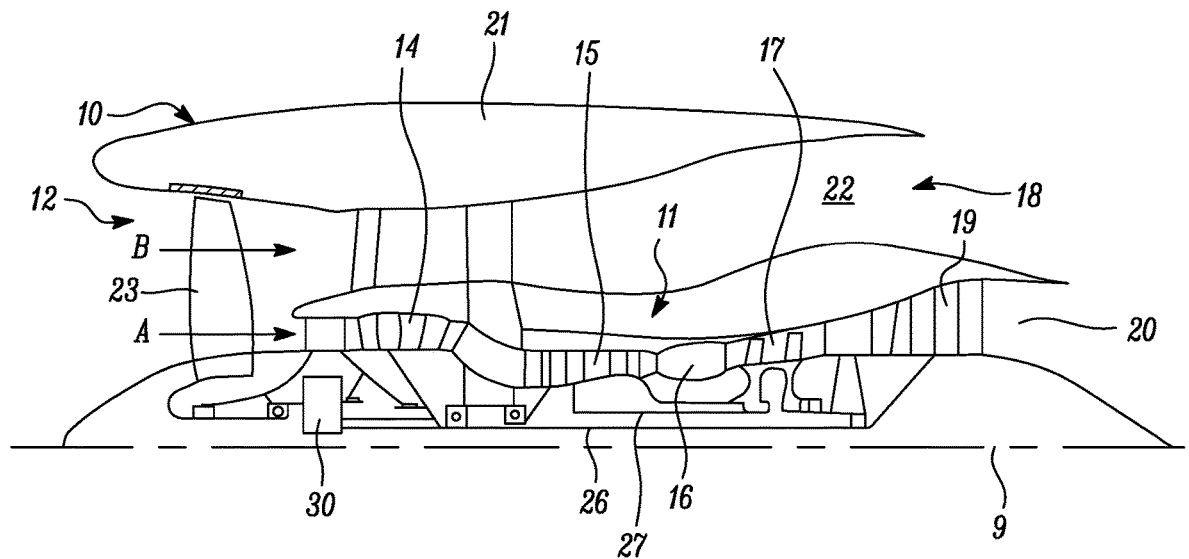
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. The turbofan engine 10 may therefore be generally termed a geared turbofan engine.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust.

The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
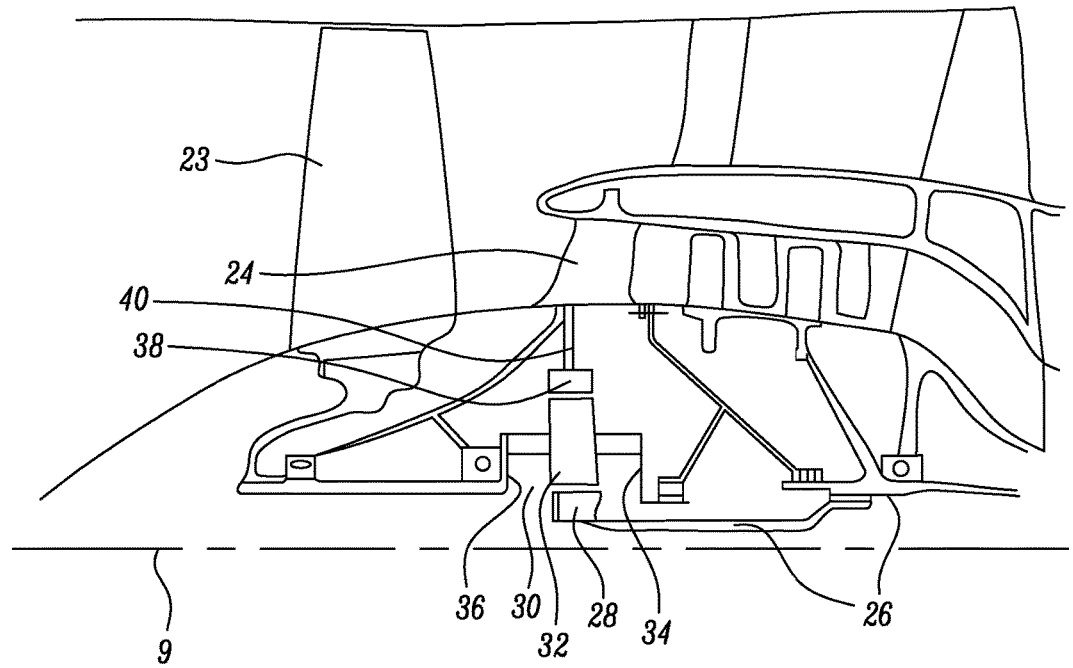
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
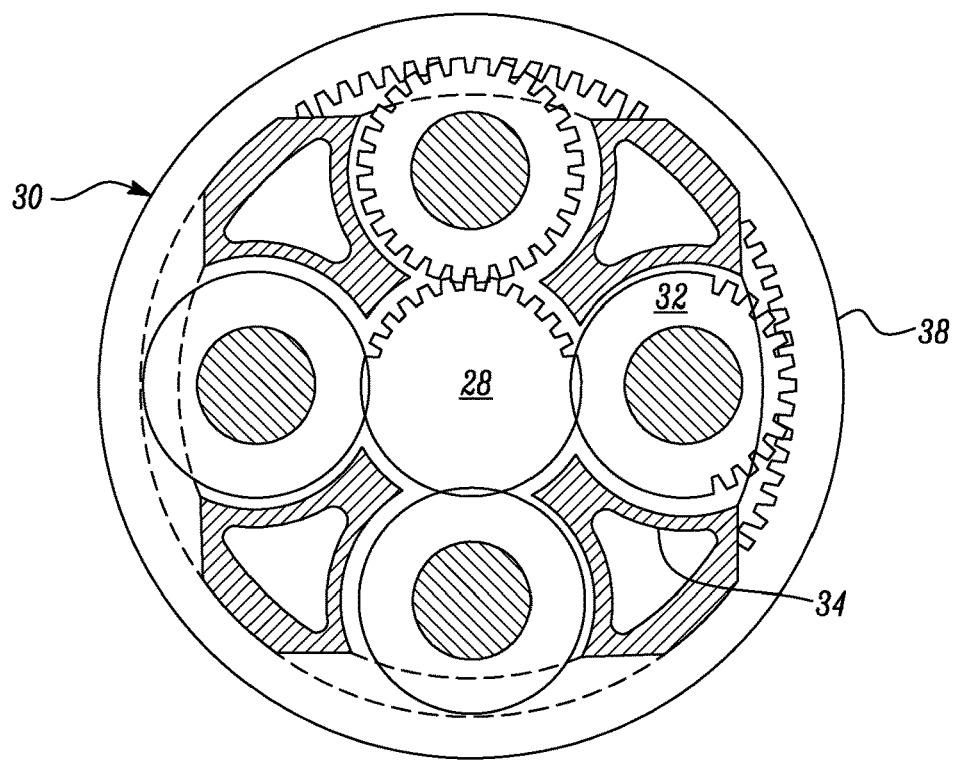
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of fan driven engine, such as an open rotor (in which the fan stage is not surrounded by a nacelle) or turboprop engine, for example. In some arrangements, the engine 10 may not comprise a gearbox 30. In other arrangements the fan may be driven by an electric motor rather than by a gas turbine.

Other turbofan engines to which the present disclosure may be applied may have alternative configurations. For example, such engines may have an alternative number of compressors and/or turbines and/or an alternative number of interconnecting shafts. By way of further example, the turbofan engine 10 of FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
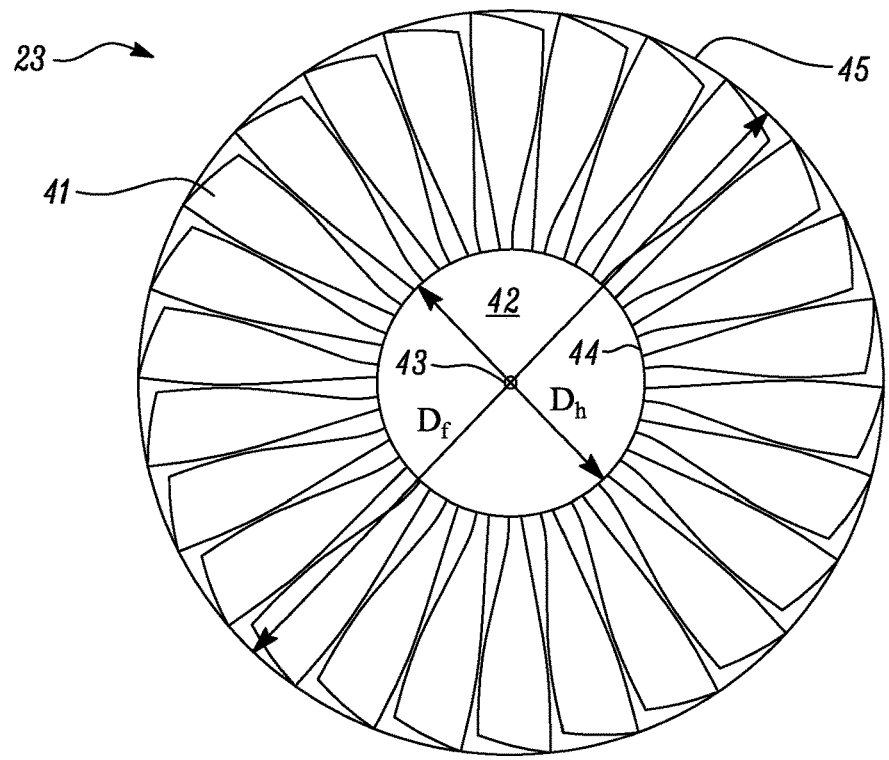
FIG. 4 is a schematic front elevation view of an example fan assembly for a turbofan engine.

FIG. 4 is a schematic front view of a fan assembly 23 for an example engine 10 of the type shown in FIGS. 1 and 2. The fan assembly 23 comprises a plurality of fan blades 41 arranged around, and attached to, a central fan disc or hub 42, the fan assembly 23 rotating about a central axis 43. The fan assembly 23 in the illustrated example comprises 26 fan blades, but in other examples may comprise greater or fewer fan blades, as described above. A first circle 44 may be defined by an outer diameter $D_h$ of the hub 42. A second circle 45 may be defined by a path swept out by the tips of the fan blades 41, defining an outer diameter $D_f$ of the fan 23. A hub to tip ratio, $R_{ht}$, may be defined as the ratio between the outer diameter $D_h$ of the hub 42 to the outer diameter $D_f$ of the fan blades 41 at the fan blade tips, i.e. $R_{ht}=D_h/D_f$.

For some existing turbofan gas turbine engines, a ratio between the mass of the hub and the combined mass of the fan blades may lie within the range of around 0.45 to around 0.7 defined herein. Such engines, however, would typically have a substantially higher hub-to-tip ratio and/or a substantially smaller outer fan diameter. As engine technology has progressed to provide increased thrust to mass ratios, the hub-to-tip ratio has tended to reduce as the diameter of the fan assembly increases together with the general overall aim of reducing mass wherever possible, including at the fan assembly hub. As a result, existing fan assemblies having a hub-to-tip ratio of between around 0.2 and 0.4, or with a fan outer diameter of 220 cm or more have a hub to fan mass ratio of below (and typically well below) 0.5 or 0.45. A low hub to fan mass ratio has surprisingly been found to be a significant factor, or cause, in vibrations being set up in the hub and/or the fan blades. By increasing the ratio, which may be done by increasing the mass of the hub and/or decreasing the mass of the fan blades, it has been found that a reduction in problematic vibrations is possible, particularly at low fan rotation speeds.

In example embodiments the fan outer diameter $D_f$ may be 220 cm or greater, 280 cm or greater, 330 cm or greater, 350 cm or greater, or in general between around 220 and 400 cm. As mentioned above, the hub-to-tip ratio may lie between around 0.2 and 0.4, or within other ranges between these limits.

Figure 5:
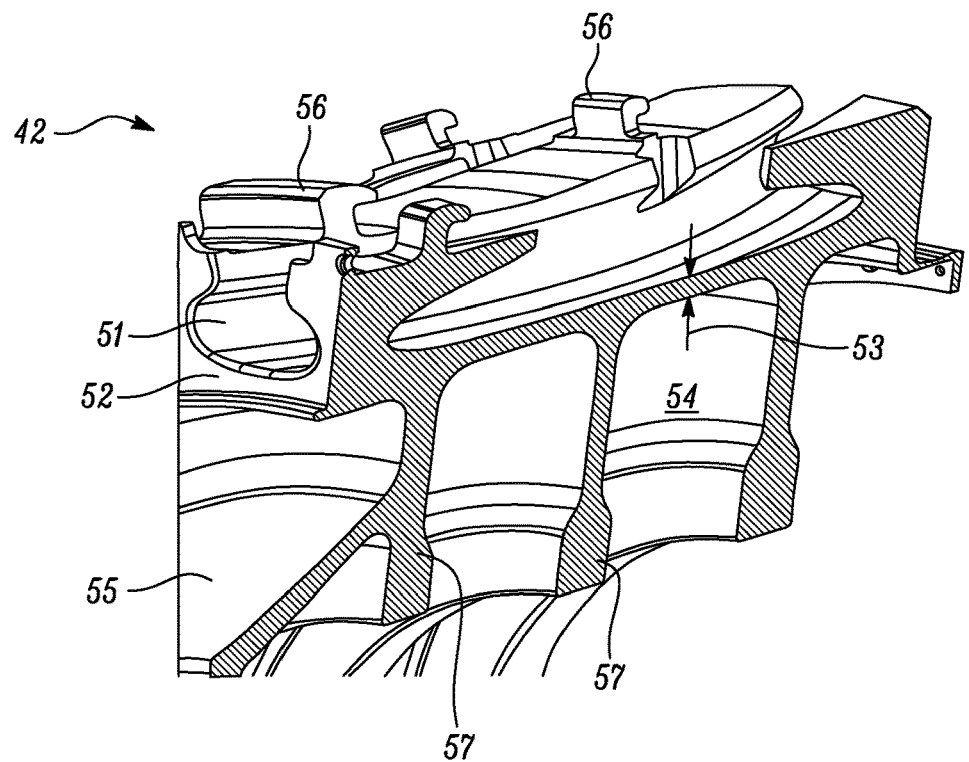
FIG. 5 is a partial cutaway view of an example hub for the fan assembly of FIG. 4.

FIG. 5 is a partial cutaway view of an example fan disc, or hub, 42 of a fan assembly 23 of the type shown in FIG. 4. Each fan blade (not shown in FIG. 5) is attached to the hub 42 by locating the root of the fan blade within a fan root slot or socket 51 having a corresponding interlocking shape, forming a dovetail joint with the fan root. Each of the slots 51 is located around a rim 52 of the hub 42. The rim 52 has a minimum radial thickness $t_{min}$ 53 defined as the minimum radial distance between a base of the slot 51 and an internal cavity 54 within the hub 42. The hub 42 is coupled to an output of the gearbox 30 (FIG. 3) of the engine 10 at a downstream end 55 of the hub 42. The connection to the gearbox 30 may for example be made by way of a splined connection to a shaft that is driven by an output of the gearbox. Other ways of connecting the hub 42 to the gearbox are also possible. In the example shown in FIG. 5 the downstream end 55 has the form of a tapered hollow section. A series of pairs of annulus filler fixings 56 is distributed around the outer circumference of the hub 42, each pair 56 being axially spaced and configured to retain an annulus filler (not shown) between a pair of adjacent fan blades in the assembled engine 10. The hub outer diameter is defined by the outer surface of the annulus fillers, which are flush with the outer surface of the fan roots.

The minimum rim thickness of existing fan assembly hubs is generally between around 10 mm and 15 mm and is nominally constant in the axial direction of the hub. For larger fan assemblies, for example those having an outer diameter $D_f$ greater than about 220 cm, the use of a hub having a rim thickness in this range has been found to result in vibration of the hub, particularly during low speed engine operation. This has been determined to be largely due to the relatively high mass of the fan blades. For fan diameters greater than about 220 cm, it has been found that this vibration during low speed engine operation can be reduced or eliminated by ensuring that the minimum rim thickness $t_{min}$ of the hub 42 scales, at least to some extent, with the fan diameter of the fan module the hub 42 is part of.

The rim thickness D of the fan disc 42 may for example be between 0.5% and 1.1% of the fan diameter $D_f$ of the fan assembly 23. If the fan assembly 23 has an outer fan diameter $D_f$ of 229 cm, the minimum rim thickness $t_{min}$ of the hub 42 would be in the range from about 11.4 mm to about 25.1 mm. An additional minimum lower limit of 15 mm may apply in this case to avoid vibration. If the fan module 23 has a fan diameter of 356 cm, the minimum rim thickness $t_{min}$ of the hub 42 would be in the range from about 17.8 mm to about 39.1 mm, although in some cases it may not be necessary to have a rim thickness greater than about 35 mm. In a general aspect therefore, the minimum rim thickness of the hub may be between around 0.5% and 1.1% of the fan outer diameter, optionally with an upper limit of around 35 mm and further optionally with a lower limit of 15 mm.

Although increasing the rim thickness is one way of increasing the mass of the hub, other ways of increasing the hub mass may also be used, for example by increasing the thickness of one or more of the supporting diaphragms 57 extending between the rim 52 and the centre of the hub 42. Other features of the hub 42 may alternatively or additionally be altered to provide an increase in overall mass.

The mass of the hub 42 may be defined as the mass of the hub alone, i.e. excluding the mass of the root portions of the fan blades and the mass of any annulus fillers attached to the hub 42. The mass of the fan blades may be defined as the mass of the blades including the root portions of the blades extending into the hub 42.

Figure 6:
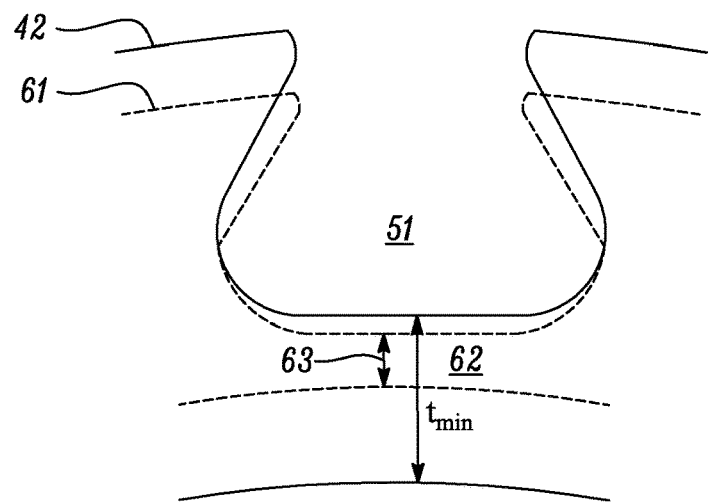
FIG. 6 is a schematic sectional view of a portion of the hub of FIG. 5.

FIG. 6 shows a schematic sectional view of a portion of the hub 42 of FIG. 5 around one of the slots 51 for holding a fan root, in comparison with a conventional hub. The conventional hub 61, indicated by dotted lines, has a rim 62 with a smaller minimum radial thickness 63 than the minimum radial thickness $t_{min}$ of the example hub 42, indicated by solid lines. This can result in a significant increase in mass, which may by itself be sufficient to raise the hub to fan mass ratio to within the desired range.

The radial thickness 53 may be substantially constant along the axial direction of the fan disc 42. In alternative examples, the radial thickness 53 may vary along the axial direction, for example so as to utilise an increase in thickness, and therefore mass, in locations where peak vibrations may be expected.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft, comprising:
an engine core comprising a turbine, a compressor, and a core shaft connecting the turbine to the compressor;
a fan assembly located upstream of the engine core; and
a gearbox that receives an input from the core shaft and outputs drive to the fan assembly so as to drive the fan assembly at a lower rotational speed than the core shaft,
wherein the fan assembly comprises a plurality of fan blades mounted around a hub, the fan blades having blade tips defining an outer diameter of the fan assembly of from around 220 cm to around 400 cm, the hub comprising a plurality of slots located around a rim of the hub, each slot receiving a root of a corresponding fan blade, wherein a ratio of a mass of the hub to a total mass of the plurality of fan blades is within a range of around 0.45 to around 0.7.

2. The gas turbine engine of claim 1 wherein a hub-to-tip ratio of the fan assembly is between around 0.2 and 0.4.

3. The gas turbine engine of claim 2 wherein the hub-to-tip ratio of the fan assembly is between around 0.2 and 0.3.

4. The gas turbine engine of claim 1, wherein the ratio of the mass of the hub to the total mass of the plurality of fan blades is within a range of around 0.5 to around 0.65.

5. The gas turbine engine of claim 4, wherein the ratio of the mass of the hub to the total mass of the plurality of fan blades is within a range of around 0.5 to around 0.6.

6. The gas turbine engine of claim 1 wherein a minimum radial thickness of the rim is within a range of around 0.5% to around 1.1% of the outer fan diameter.

7. The gas turbine engine of claim 6 wherein the minimum radial thickness is no greater than 35 mm.

8. The gas turbine engine of claim 6 wherein an average of the minimum rim thickness along a rotation axis of the fan assembly is within a range of around 0.5 to around 1.1% of the outer fan diameter.

9. The gas turbine engine of claim 1 wherein the outer diameter of the fan assembly is around 280 cm or greater.

10. The gas turbine engine of claim 1 wherein the outer diameter of the fan assembly is around 330 cm or greater.

11. The gas turbine engine of claim 1 wherein a gear ratio of the gearbox is in a range of from 3.2 to 5.

12. The gas turbine engine of claim 1 wherein a gear ratio of the gearbox is in a range of from 3.2 to 4.2.

13. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

14. A gas turbine engine for an aircraft, comprising:
an engine core comprising a turbine, a compressor, and a core shaft connecting the turbine to the compressor;
a fan assembly located upstream of the engine core; and
a gearbox that receives an input from the core shaft and outputs drive to the fan assembly so as to drive the fan assembly at a lower rotational speed than the core shaft,
wherein the fan assembly comprises a plurality of fan blades mounted around a hub, a hub-to-tip ratio of the fan assembly being between around 0.2 and 0.4, the hub comprising a plurality of slots located around a rim of the hub, each slot receiving a root of a corresponding fan blade, wherein a ratio of a mass of the hub to a total mass of the plurality of fan blades is within a range of around 0.45 to around 0.7.

15. The gas turbine engine of claim 14 wherein the fan blades have blade tips defining an outer diameter of the fan assembly of from around 220 cm to around 400 cm.

\* \* \* \* \*